Oct. 1, 1968  R. T. EDDY  3,403,601
EFFORT SELECTOR
Filed April 15, 1966
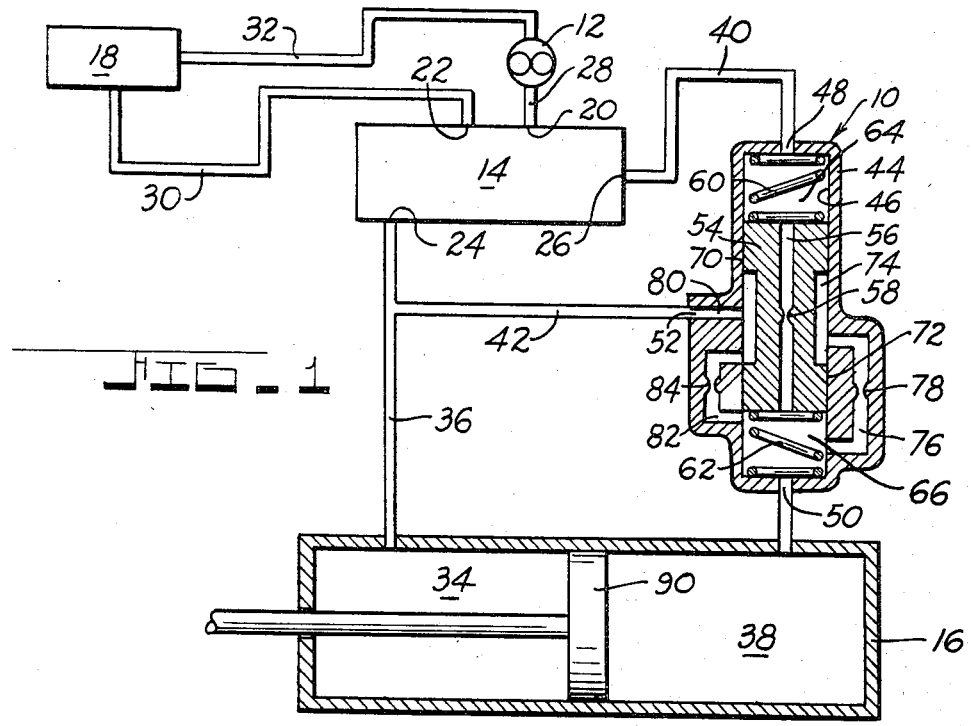
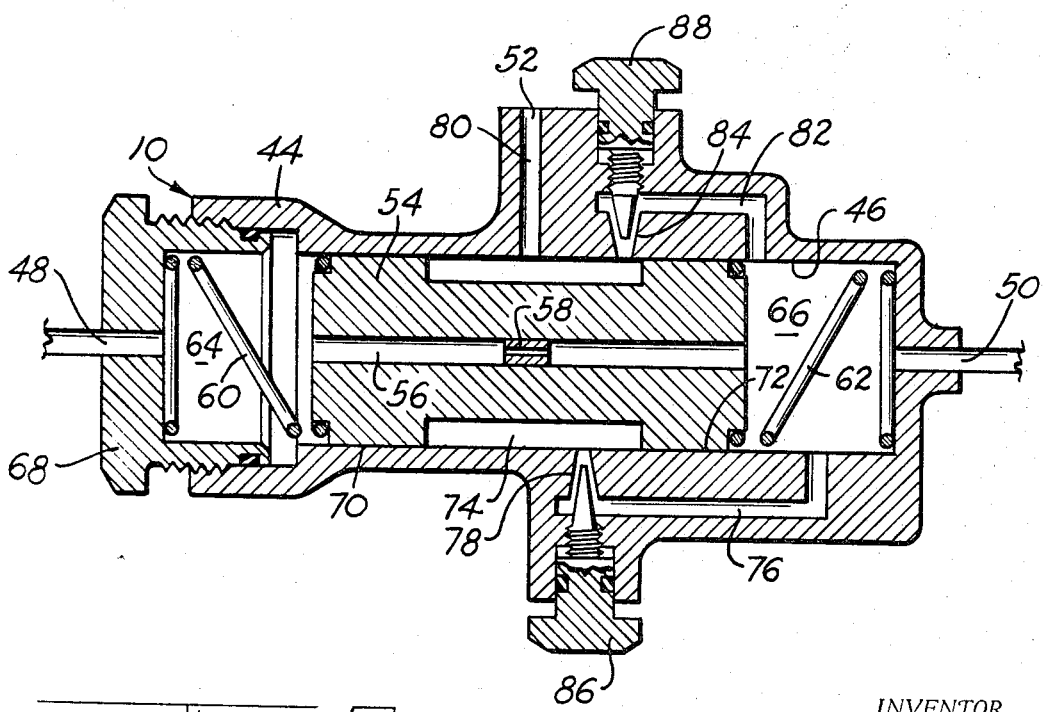
INVENTOR.
ROBERT T. EDDY.
BY
*William N. Antonis*
ATTORNEY United States Patent Office 3,403,601
Patented Oct. 1, 1968

3,403,601
EFFORT SELECTOR
Robert T. Eddy, South Bend, Ind., assignor to The Bendix Corporation, a corporation of Delaware
Filed Apr. 15, 1966, Ser. No. 542,794
6 Claims. (Cl. 91—438)

ABSTRACT OF THE DISCLOSURE

An effort selector device for use in a hydraulic power steering system which operates as a function of the fluid flow to and from a power cylinder having selectively alternating high and low pressure sides. The device is interposed between the power steering control valve and the power cylinder and provides a variation in road feel by metering a portion of the fluid from the high pressure side of the power piston to the low pressure side of the piston.

---

This invention relates to power steering and more particularly to an effort selector device for use in conjunction with a hydraulic power steering device which is an improvement in the effort selector device disclosed and claimed in my copending application Ser. No. 408,246, filed Nov. 2, 1964, now Patent No. 3,267,864.

One of the objects of this invention is to provide a device for conveniently adjusting driving efforts to correspond to individual driver tastes.

Another object of this invention is to provide an effort selector device which will function without sacrificing steering speed.

A further object of this invention is to provide an effort selector device which can be used in conjunction with any relatively inexpensive power steering control valve having relatively poor "feel" to improve the "feel" characteristics of said valve to any desired value.

More specifically, it is an object of this invention to provide an effort selector device which is interposed between the power steering control valve and the power cylinder and provides a variation in road feel by metering a portion of the fluid from the high pressure side of the power piston to the low pressure side of the piston. The amount of fluid metered by the effort selector device may be varied by one or more adjustable orifices located in the device. Thus, for a given boost of the steering system, the control valve is required to redirect a larger quantity of fluid, since a portion of this fluid is communicated to the low pressure side of the piston. In other words, as long as fluid from the power steering valve to the high pressure side of the power cylinder is being bypassed to the low pressure side of the power cylinder, larger power steeling control valve movements are necessary to achieve a given differential cylinder pressure. Such increased control valve movements result in higher steering efforts.

An important object of this invention is to provide an effort selector device which operates as a function of the fluid flow to and from the power cylinder rather than as a function of pump pressure.

The above and other objects and features of this invention will be apparent from the following description of the mechanism taken in connection with the accompanying drawing which forms a part of this disclosure and in which:

FIGURE 1 is a schematic illustration of the invention shown in conjunction with a hydraulic power steering system; and FIGURE 2 is a sectional view of the effort selector device shown in the system of FIGURE 1.

Referring to FIGURE 1, it will be seen that numeral 10 designates an effort selector device incorporated in a hydraulic power steering system which includes a pump 12, a control valve 14, a power cylinder 16, and a reservoir 18. It will be understood that the effort selector device 10 can be used in conjunction with any conventional hydraulic power steering system and need only be interposed between the power steering control valve and power cylinder so that a controlled amount of fluid from the high pressure side of the cylinder can be bypassed to the low pressure side of the cylinder. The control valve 14 includes a pressure port 20, a suitably restricted return port 22, and two cylinder ports 24 and 26. Conduit 28 communicates pump 12 with pressure port 20, conduit 30 communicates return port 22 with reservoir 18, and conduit 32 communicates the reservoir with the pump. Cylinder port 24 communicates with chamber 34 on the piston rod side of the power cylinder via conduit 36, whereas cylinder port 26 communicates with chamber 38 on the other side of the piston via conduit 40. The effort selector device 10 is interposed in conduit 40 and communicates with conduit 36 via conduit 42.

The effort selector device 10 comprises a valve housing 44 having a bore 46 therein and three ports 48, 50 and 52 communicating with said bore. Located within the bore is a cylindrical plunger 54 having a passage 56 extending axially therethrough with a restricted orifice 58 therein. The plunger is maintained in a central or neutral position by oppositely disposed equally preloaded springs 60 and 62 located in chambers 64 and 66 respectively. The components in the bore are maintained therein by a hollow adjusting screw 68 which is utilized to center the plunger. Located on the outer periphery of the plunger 54 are two annular lands 70 and 72 and an annular groove 74 therebetween. Flow between ports 50 and 52 will occur through one of two flow paths, the first of which includes chamber 66, passage 76 containing variable orifice 78, annular groove 74, and passage 80, and the second of which includes chamber 66, passage 82 containing variable orifice 84, annular groove 74, and passage 80. Orifices 78 and 84 can be varied, as desired, by rotating needle valves 86 and 88, respectively, which are threaded into housing 44. The system is arranged so that during low pressure steering requirements, such as will occur during highway driving, flow will be bypassed through both variable orifices 78 and 84, whereas during high pressure steering requirements, such as will occur during hard highway or city cornering, flow will be bypassed only through variable orifice 78. At extremely high pressures, such as those which will occur during parking, flow through both variable orifices 78 and 84 will be cut off.

The effort selector device works on the principle that for any given power steering maneuver a certain pressure differential across the piston 90 of power cylinder 16 is required. If a portion of the fluid flow to the high pressure side of the piston is diverted to the low pressure side of the piston, larger control valve movements will be needed to achieve the desired pressure differential across the piston. Since such larger control valve movements can be achieved only by additional driver steering efforts, it will be obvious that the steering efforts are proportional to the amount of fluid being bypassed through variable orifices 78 and 84 of the effort selector device to the low pressure side of the piston. In other words, if the size of the variable orifices is increased, steering efforts will be increased. If the size of the variable orifices is decreased, steering efforts will likewise decrease. Thus, any desired effort for any given type of driving can be controlled by varying the orifices 78 and 84 by rotating needle valves 86 and 88.

Specific operation of the effort selector device will be as follows: If chamber 38 of the power cylinder 16 is the high pressure side, fluid flow from control valve 14 to cylinder chamber 38 will occur via cylinder port 26, conduit 40, port 48, chamber 64, passage 56, chamber 66, and port 50. A portion of this fluid will be bypassed to the low pressure side of the power cylinder via the flow path containing variable orifice 84 and via the flow path containing variable orifice 78. Since flow from the control valve to the high pressure side of the cylinder occurs through a passage 56 containing restricted orifice 58, a pressure drop will occur between chambers 64 and 66. At some predetermined flow, the resulting pressure differential across the plunger 54 (which pressure differential is a function of the size of the orifice 58 and the rate of the springs 60 and 62) will cause the plunger to move sufficiently to cut off flow through the flow path containing variable orifice 84. Upon further increase in the pressure differential across plunger 54, such as may occur during parking, the plunger will be caused to move to a position wherein flow through the flow path containing variable orifice 78 is also cut off. Upon the occurrence of the latter, no fluid at all will be bypassed to the low pressure side of the cylinder and all of the fluid from the control valve will be directed to the high pressure side of the cylinder.

If chamber 34 of the power cylinder is the high pressure side, fluid flow from control valve 14 to cylinder chamber 34 will occur via cylinder port 24 and conduit 36. A portion of this fluid will be bypassed to the low pressure side of the power cylinder via conduit 42 and the two previously mentioned flow paths, one of which contains variable orifice 78 and the other of which contains variable orifice 84. Inasmuch as in this situation fluid flow will be from chamber 66 of the effort selector device to chamber 64 via restricted passage 56, the pressure drop will be in the direction which causes the plunger to move against spring 60. Thus, movement against spring 60 will initially result in movement of the plunger to a first position wherein flow through the variable orifice 84 will be cut off and thence to a second position wherein flow through the variable orifice 78 will be cut off. Accordingly, it will be seen that plunger 54 is caused to move against spring 60 or 62 a predetermined distance depending on the direction and amount of flow through restricted passage 56 of the plunger.

From the foregoing description it will be understood that the described effort selector device senses the flow bypassed by any conventional power steering control valve and that during operation the plunger in the effort selector is positioned by the amount of flow from the control valve. This plunger position in turn meters a portion of this fluid to the low pressure side of the power piston. The amount of fluid metered by the effort selector device can be varied by adjusting the previously described variable orifices in the effort selector device to thereby obtain the desired steering effort for maneuvering the vehicle.

The several practical advantages which flow from this invention are believed to be obvious from the above description, and other advantages may suggest themselves to those who are familiar with the art to which the invention relates.

Furthermore, although this invention has been described in connection with a specific embodiment, it will be obvious to those skilled in the art that various changes may be made in the form, structure, and arrangement of parts without departing from the spirit of the invention. Accordingly, I do not desire to be limited to the specific embodiment disclosed herein primarily for purposes of illustration, but instead desire protection falling within the scope of the appended claims.

Having thus described the various features of the invention, what I claim as new and desire to secure by Letters Patent is:

1. In a hydraulic power steering system having a pump, a reservoir, a control valve having a restricted exhaust, and a power cylinder having selectively alternating high and low pressure sides, an effort selector device located between said control valve and said power cylinder for metering a portion of the fluid from the high pressure side of said power cylinder to the low pressure side of said power cylinder, said device comprising a housing having a bore therein, a first port in said housing communicating with the high pressure side of said power cylinder, a second port in said housing communicating with the low pressure side of said power cylinder, a third port in said housing communicating with said control valve, first passage means located in said housing for communicating said first port with said second port, first restricted orifice means located in said first passage means, a movable plunger located in said bore for controlling flow through said first passage means, second passage means located in said plunger and extending from one end thereof to the other end thereof for communicating one end of said plunger with said third port and the other end thereof with one of said other two ports, second restricted orifice means located in said second passage means, a first spring located at one end of said plunger for opposing movement thereof in one direction, and a second spring located at the other end of said plunger for opposing movement thereof in the opposite direction.

2. An effort selector device, as defined in claim 1, wherein adjustment means are operatively connected to said first restricted orifice means for varying its effective flow area.

3. An effort selector device, as defined in claim 2, wherein said first passage means comprises a primary passage having a restricted orifice therein and a secondary passage having a restricted orifice therein.

4. An effort selector device, as defined in claim 3, wherein said plunger includes a single annular groove formed thereon for permitting fluid flow through both of said primary and secondary passages.

5. An effort selector device, as defined in claim 4, wherein said plunger has a first position for permitting fluid flow through both of said primary and secondary passages, a second position for permitting fluid flow through only one of said primary and secondary passages, and a third position for preventing flow through both of said primary and secondary passages.

6. An effort selector device, as defined in claim 2, wherein said adjustment means includes a movable needle valve member.

References Cited

UNITED STATES PATENTS

| | | | |
|---|---|---|---|
| 2,789,576 | 4/1957 | Mitchell | 137—117 |
| 2,791,229 | 5/1957 | Pasco | 137—117 |
| 2,896,903 | 7/1959 | Canalizo | 91—447 |
| 2,993,500 | 7/1961 | Robinson | 137—117 |
| 3,033,168 | 5/1962 | Ruhl | 91—438 |
| 3,136,328 | 6/1964 | Hipp | 137—117 |
| 3,152,603 | 10/1964 | Zeisloft | 137—117 |
| 3,168,010 | 2/1965 | Thomas | 91—447 |
| 3,217,732 | 11/1965 | Haugeland | 137—117 |
| 3,267,864 | 8/1966 | Eddy | 103—42 |

MARTIN P. SCHWADRON, *Primary Examiner.*

B. L. ADAMS, *Assistant Examiner.*